(12) United States Patent
Yoshida et al.

(10) Patent No.: US 9,000,076 B2
(45) Date of Patent: Apr. 7, 2015

(54) PROCESS FOR PRODUCING NON-AQUEOUS BATTERY ELECTRODE-FORMING BINDER SOLUTIONS, AND NON-AQUEOUS BATTERY ELECTRODE-FORMING BINDER SOLUTION

(75) Inventors: Masaomi Yoshida, Tokyo (JP); Taichi Kimura, Tokyo (JP); Hideki Kitamura, Tokyo (JP)

(73) Assignee: Kureha Corporation, Tokyo (JP)

( * ) Notice: Subject to any disclaimer, the term of this patent is extended or adjusted under 35 U.S.C. 154(b) by 327 days.

(21) Appl. No.: 13/392,727

(22) PCT Filed: Aug. 19, 2010

(86) PCT No.: PCT/JP2010/064013
§ 371 (c)(1),
(2), (4) Date: Feb. 27, 2012

(87) PCT Pub. No.: WO2011/024708
PCT Pub. Date: Mar. 3, 2011

(65) Prior Publication Data
US 2012/0157590 A1    Jun. 21, 2012

(30) Foreign Application Priority Data
Aug. 28, 2009  (JP) .................................. 2009-198123

(51) Int. Cl.
H01M 4/62 (2006.01)
H01M 4/13 (2010.01)
H01M 10/0525 (2010.01)

(52) U.S. Cl.
CPC .............. H01M 4/621 (2013.01); H01M 4/623 (2013.01); *H01M 4/13* (2013.01); *H01M 10/0525* (2013.01)

(58) Field of Classification Search
CPC .............................. C08F 14/22; C08K 5/3412

USPC .................................. 524/104, 545; 429/217
See application file for complete search history.

(56) References Cited

U.S. PATENT DOCUMENTS

| 6,447,669 | B1 * | 9/2002 | Lain ............................... 205/705 |
| 7,214,410 | B2 * | 5/2007 | Szmanda et al. ........... 427/385.5 |
| 2004/0131862 | A1 | 7/2004 | Szmanda et al. |
| 2006/0122299 | A1 * | 6/2006 | Kouchachvili et al. ........ 524/356 |
| 2007/0021570 | A1 * | 1/2007 | Blaude et al. .............. 525/326.2 |
| 2010/0028773 | A1 | 2/2010 | Hirota et al. |
| 2010/0270509 | A1 * | 10/2010 | Sakuma et al. ............... 252/500 |
| 2011/0171526 | A1 | 7/2011 | Wakizaka et al. |

FOREIGN PATENT DOCUMENTS

| JP | 5329338 A | 12/1993 |
| JP | 11343317 A | 12/1999 |
| JP | 2003123742 A | 4/2003 |
| JP | 2004105865 A | 4/2004 |
| JP | 2006169503 A | 6/2006 |
| JP | 2009164062 A | 7/2009 |
| WO | 2008108360 A1 | 9/2008 |
| WO | WO 2009047969 A1 * | 4/2009 |
| WO | 2010032784 A1 | 3/2010 |

* cited by examiner

*Primary Examiner* — Nicole M Buie-Hatcher
(74) *Attorney, Agent, or Firm* — The Webb Law Firm

(57) ABSTRACT

Provided is a process for producing non-aqueous battery electrode-forming binder solutions which includes a step of performing filtration with a filtration accuracy that enables suppressing of the occurrence of internal short circuits (shorts) in non-aqueous batteries such as lithium ion secondary batteries. The process includes a step (A) of filtering a polymer solution of a vinylidene fluoride resin in an organic solvent through a filter membrane (a) that is made of a polyolefin resin and has an initial filtration efficiency of not less than 99.9% for a filtering particle size of 20 μm.

11 Claims, 1 Drawing Sheet

PROCESS FOR PRODUCING NON-AQUEOUS BATTERY ELECTRODE-FORMING BINDER SOLUTIONS, AND NON-AQUEOUS BATTERY ELECTRODE-FORMING BINDER SOLUTION

TECHNICAL FIELD

The present invention relates to a process for producing non-aqueous battery electrode-forming binder solutions, and to a non-aqueous battery electrode-forming binder solution.

BACKGROUND ART

Recently, the electronic technology has made a remarkable progress and various devices have been reduced in size and weight. In accordance with the miniaturization and the weight reduction of electronic devices, batteries that supply power to such devices are also required to be smaller and lighter. Non-aqueous lithium secondary batteries (hereinafter, also referred to as lithium ion secondary batteries), which have a small volume and are lightweight, can supply large amounts of energy and are used as power sources mainly in small household electronic devices such as cellular phones, personal computers and video camcorders.

An electrode of a lithium ion secondary battery is generally prepared by, for example, kneading a powdery active substance together with a binder, a liquid substance and optionally additives such as a conductive auxiliary to give an electrode-forming composition (hereinafter, also referred to as the "slurry"), applying the slurry onto a metallic collector such as aluminum, copper, nickel, titanium or stainless steel, and drying the slurry to remove the liquid substance, thus resulting in an electrode in which a layer containing the active substance is formed on the collector.

The binder contained in the slurry is required to effectively bond the active substance to the collector as well as to stabilize the slurry. A stable slurry is such that an active substance is dispersed homogenously and the slurry can maintain a constant viscosity for at least several days without precipitation or separation of the active substance or any other components in the slurry and can be applied to a collector uniformly so as to form a smooth layer on the collector which contains the active substance in a uniform composition.

It is known that a vinylidene fluoride resin be used as a binder in order to obtain a stable slurry.

There have recently been accidents caused by the ignition of lithium ion secondary batteries and associated recalls of products. Since secondary batteries are mounted on some types of automobiles such as electric cars and hybrid cars, the safety and the reliability of lithium ion secondary batteries have become of greater importance than ever.

Extreme overheating and ignition of secondary batteries such as lithium ion secondary batteries are frequently attributed to short circuits (shorts) that take place within the batteries (hereinafter, also referred to as internal short circuits). A conductive contaminant in a secondary battery can cause electrodes to be physically or chemically short circuited. Thus, a binder solution used for the formation of electrodes is required to be free of any conductive foreign substances such as metallic foreign substances.

A large number of techniques to filter a polymer solution have been heretofore known (for example, see JP-A-2004-105865).

JP A 2004-105865 discloses that a polymer solution is filtered through a plurality of filtering steps whereby the filtration life of filter membranes is extended and the filtration accuracy is improved.

Although many techniques for filtering a polymer solution are known, the required filtration accuracy differs in accordance with the use application of the filtered polymer solution. It is not realistic to remove all minute foreign substances in the solution without considering the filtration accuracy because the productivity of the filtered polymer solution is deteriorated and the costs are increased. Filtration accuracy which enables suppressing of the occurrence of internal short circuits (shorts) in non-aqueous batteries such as lithium ion secondary batteries has not been considered.

The present invention has been made in view of the problems in the art described above. It is therefore an object of the invention to provide a process for producing non-aqueous battery electrode-forming binder solutions which includes a step of performing filtration with a filtration accuracy that enables suppressing of the occurrence of internal short circuits (shorts) in non-aqueous batteries such as lithium ion secondary batteries, and to provide a non-aqueous battery electrode-forming binder solution that is obtained by the process.

SUMMARY OF THE INVENTION

The present inventors carried out studies with respect to the filtration accuracy required for a non-aqueous battery electrode-forming binder solution. They have then found that a non-aqueous battery electrode-forming binder solution produced by a specific process enables the production of an electrode for a non-aqueous battery such as a lithium ion secondary battery which can suppress the occurrence of internal short circuits (shorts). The present invention has been completed based on the finding.

A process for producing non-aqueous battery electrode-forming binder solutions according to the present invention includes a step (A) of filtering a polymer solution of a vinylidene fluoride resin in an organic solvent through a filter membrane (a) that is made of a polyolefin resin and has an initial filtration efficiency of not less than 99.9% for a filtering particle size of 20 μm.

In a preferred embodiment, the filter membrane (a) has a multilayer structure having two or more layers, and the opening size of the filter membrane (a) on a secondary side is smaller than the opening size on a primary side.

In a preferred embodiment, the filter membrane (a) is a cylindrical filter membrane that has been pleated so as to have vertical grooves on the entire outer peripheral surface thereof, and a filter element in which thermoplastic resin plates are joined to upper and lower ends of the cylindrical filter membrane is used in the step (A).

The process preferably includes at least one step that is upstream of the step (A) and is selected from a step (X) of preliminarily filtering the polymer solution through a prefilter, and a step (Y) of removing at least part of a magnetic substance present in the polymer solution through a magnetic filter.

It is preferable that after the step (A), the polymer solution be placed into a container without any contact with a metal.

The vinylidene fluoride resin is preferably at least one resin selected from vinylidene fluoride homopolymers, copolymers of vinylidene fluoride and another monomer, modified products of vinylidene fluoride homopolymers, and modified products of copolymers of vinylidene fluoride and another monomer.

The organic solvent is preferably N-methyl-2-pyrrolidone.

In a preferred embodiment, the step (A) is a step in which the polymer solution is filtered by being pressurized with nitrogen gas and thereby being passed from a primary side of the filter membrane (a) toward a secondary side, and the difference between the pressure on the secondary side and that on the primary side in the step (A) is maintained in the range of 0.01 to 0.1 MPa.

In a preferred embodiment, the temperature of the polymer solution is 10 to 70° C., and the solution viscosity is 250 to 3500 mPa·s.

The process preferably includes, after the step (A) is performed, placing the polymer solution into a container, encapsulating nitrogen gas into the container containing the polymer solution so as to fill the space in the container, and tightly sealing the container.

A non-aqueous battery electrode-forming binder solution according to the present invention is produced by the aforementioned process for producing non-aqueous battery electrode-forming binder solutions.

In the non-aqueous battery electrode-forming binder solution, the number of foreign substances that are 20 μm or more in maximum size is preferably not more than 1 per 400 ml of the electrode-forming binder solution.

Advantageous Effects of Invention

According to the inventive process for producing non-aqueous battery electrode-forming binder solutions, a non-aqueous battery electrode-forming binder solution can be obtained which is free of foreign substances that can cause internal short circuits (shorts). A non-aqueous battery such as a lithium ion secondary battery which has an electrode formed using the non-aqueous battery electrode-forming binder solution of the invention is prevented from the occurrence of internal short circuits (shorts).

DETAILED DESCRIPTION OF THE EMBODIMENTS

Figure 1:
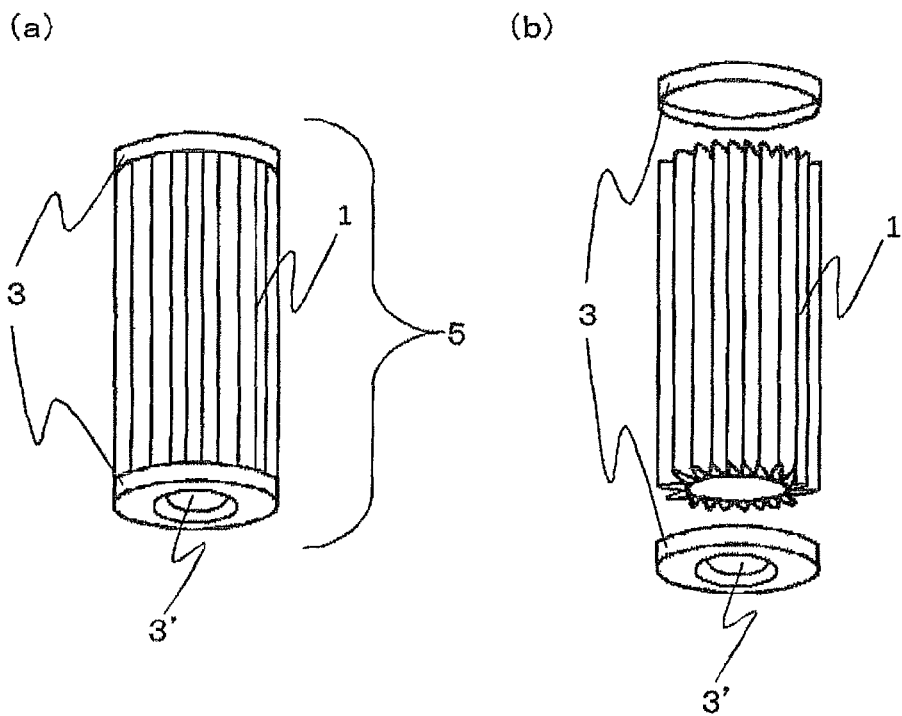
FIGS. 1(a) and 1(b) are perspective views illustrating a filter element which may be used in a process for producing non-aqueous battery electrode-forming binder solutions according to the invention.

The present invention will be described in greater detail hereinbelow.

<Processes for Producing Non-Aqueous Battery Electrode-Forming Binder Solutions>

A process for producing non-aqueous battery electrode-forming binder solutions according to the present invention includes a step (A) of filtering a polymer solution of a vinylidene fluoride resin in an organic solvent through a filter membrane (a) that is made of a polyolefin resin and has an initial filtration efficiency of not less than 99.9% for a filtering particle size of 20 μm.

In the process for producing non-aqueous battery electrode-forming binder solutions according to the invention, a polymer solution is used which is obtained by dissolving a vinylidene fluoride resin in an organic solvent.

The vinylidene fluoride resin dissolved in the polymer solution is not particularly limited as long as the resin has a structural unit derived from vinylidene fluoride. Examples of the vinylidene fluoride resins include vinylidene fluoride homopolymers, copolymers of vinylidene fluoride and another monomer, modified products of vinylidene fluoride homopolymers, and modified products of copolymers of vinylidene fluoride and another monomer. Typically, a single resin selected from these resins is used. However, two or more resins may be used.

Exemplary other monomers include carboxyl group-containing monomers, carboxylic anhydride group-containing monomers, fluorine-containing monomers except vinylidene fluoride, and α-olefins. These other monomers may be used singly, or two or more may be used.

Preferred examples of the carboxyl group-containing monomers include unsaturated monobasic acids, unsaturated dibasic acids and monoesters of unsaturated dibasic acids, with unsaturated dibasic acids and monoesters of unsaturated dibasic acids being more preferable.

An example of the unsaturated monobasic acids is acrylic acid. Examples of the unsaturated dibasic acids include maleic acid and citraconic acid. Preferred examples of the monoesters of unsaturated dibasic acids are those having 5 to 8 carbon atoms such as maleic acid monomethyl ester, maleic acid monoethyl ester, citraconic acid monomethyl ester and citraconic acid monoethyl ester.

In particular, preferred carboxyl group-containing monomers are maleic acid, citraconic acid, maleic acid monomethyl ester and citraconic acid monomethyl ester.

Examples of the carboxylic anhydride group-containing monomers include unsaturated dibasic acid anhydrides. Examples of the unsaturated dibasic acid anhydrides include maleic anhydride and citraconic anhydride.

Examples of the fluorine-containing monomers except vinylidene fluoride include vinyl fluoride, trifluoroethylene, trifluorochloroethylene, tetrafluoroethylene and hexafluoropropylene.

Examples of the α-olefins include ethylene, propylene and 1-butene.

Preferred copolymers of vinylidene fluoride and another monomer(s) include a copolymer of vinylidene fluoride and maleic acid monomethyl ester and a copolymer of vinylidene fluoride, hexafluoropropylene and maleic acid monomethyl ester.

The copolymers of vinylidene fluoride and another monomer may be obtained by copolymerizing vinylidene fluoride and any of the aforementioned monomers.

Vinylidene fluoride may be homopolymerized or copolymerized with another monomer by any methods without limitation. Exemplary polymerization methods include suspension polymerization, emulsion polymerization and solution polymerization.

The modified products of vinylidene fluoride homopolymers and the modified products of copolymers of vinylidene fluoride and another monomer may be obtained by modifying the aforementioned vinylidene fluoride homopolymers or the copolymers of vinylidene fluoride and another monomer. Monomers having a carboxyl group or a carboxylic anhydride group such as maleic acid and maleic anhydride are preferably used for the modification.

The vinylidene fluoride resin used in the invention preferably includes not less than 50 mol % of structural units derived from vinylidene fluoride (wherein the total of all the structural units is 100 mol %).

A commercial vinylidene fluoride resin may be used.

The organic solvent for dissolving the vinylidene fluoride resin is preferably one which exhibits excellent solvent properties for vinylidene fluoride resins. Examples of such organic solvents having excellent solvent properties for vinylidene fluoride resins include aprotic polar solvents. Specific examples of preferred organic solvents include N-methyl-2-pyrrolidone, dimethylformamide and dimethylacetamide. N-methyl-2-pyrrolidone is a particularly preferred organic solvent because it has an excellent capability of dissolving vinylidene fluoride resins, is a general compound having relatively low toxicity, and is easily handled in terms of boiling point and vapor pressure.

The polymer solution used in the invention may be obtained by dissolving the aforementioned vinylidene fluoride resin in the organic solvent. The concentration of the vinylidene fluoride resin in the polymer solution is preferably 0.5 to 30 wt %, and more preferably 3 to 14 wt %.

The polymer solution used in the invention preferably has a solution temperature of 10 to 70° C., and more preferably 30 to 60° C. The solution viscosity of the polymer solution is preferably 250 to 3500 mPa·s, and more preferably 500 to 2500 mPa·s.

If the solution temperature is excessively low, the solution viscosity is increased to lower the throughput in the step (A) and in the steps (X) and (Y) which are performed in a preferred embodiment, thus resulting in deteriorations in the productivity of the non-aqueous battery electrode-forming binder solution. If the solution temperature is excessively high, the container which contains and seals the non-aqueous battery electrode-forming binder solution can be deformed. Such a deformation is caused by a decrease in the pressure of the upper space in the container due to lowering of the solution temperature when the hot non-aqueous battery electrode-forming binder solution is placed and sealed in the container.

The polymer solution used in the invention usually contains solid foreign substances. Such foreign substances can find their way into the solution during various operations such as the production of the vinylidene fluoride resin, the synthesis of the organic solvent, and the preparation of the polymer solution. According to the inventive process for producing non-aqueous battery electrode-forming binder solutions, such foreign substances can be removed in a favorable manner. The obtained non-aqueous battery electrode-forming binder solution enables the production of an electrode for a non-aqueous battery such as a lithium ion secondary battery which can suppress the occurrence of internal short circuits (shorts).

The process for producing non-aqueous battery electrode-forming binder solutions preferably includes at least one step that is upstream of the step (A) and is selected from a step (X) of preliminarily filtering the polymer solution through a prefilter, and a step (Y) of removing at least part of a magnetic substance present in the polymer solution through a magnetic filter. In a particularly preferred embodiment, the process includes both the step (X) and the step (Y). In the most preferred embodiment, the step (X) is followed by the step (Y), and the step (Y) is followed by the step (A).

In the step (X), the polymer solution is preliminarily filtered through a prefilter. The term preliminary filtration indicates a filtration operation that precedes the step (A). The prefilter used in the step (X) usually has a capability of removing particles having a larger diameter than that of particles removed by the filter membrane (a) used in the step (A). The prefilter used herein is preferably capable of capturing solids that are several tens of μm or more in size. The solids which are captured are foreign substances in the polymer solution and may include undissolved vinylidene fluoride resin. In the event that undissolved vinylidene fluoride resin is captured, at least part of the resin on the prefilter may be dissolved and pass through the prefilter.

The prefilter is not particularly limited. For example, a stainless steel filter having 200 to 400 meshes may be used. A basket-shaped strainer or a Y-shaped strainer may also be used as the prefilter. The term meshes indicates the number of pores per 1 inch (25.4 mm).

In the step (Y), at least part of a magnetic substance present in the polymer solution is removed through a magnetic filter. The magnetic filter used in the step (Y) is a device which can remove magnetic substances such as metals by the magnetic force of a magnet such as a permanent magnet or an electromagnet. The magnetic filter can remove magnetic foreign substances of any size. Of the foreign substances present in the polymer solution, magnetic substances such as metals can be removed through the step (Y). Magnetic substances may be removed also in the step (A) described later. However, performing the step (Y) delays the occurrence of clogging of the filter membrane (a) used in the step (A). Further, the pressure loss caused in the step (A) may be maintained at a low level.

For example, the magnetic filter may be a magnetic iron remover. The magnetic flux density of the magnetic filter is preferably 1000 to 15000 Gs, and more preferably 6000 to 13000 Gs.

When the non-aqueous battery electrode-forming binder solution is continuously produced in a plant, the prefilter and the magnetic filter need to be detached for a routine inspection or cleaning. The members are rubbed each other when the prefilter and the magnetic filter are detached, possibly generating metallic foreign substances. However, the step (A) prevents such metallic foreign substances from contaminating the non-aqueous battery electrode-forming binder solution.

In the step (A) in the inventive process for producing non-aqueous battery electrode-forming binder solutions, the aforementioned polymer solution is filtered through the filter membrane (a) that is made of a polyolefin resin and has an initial filtration efficiency of not less than 99.9% for a filtering particle size of 20 μm.

In the step (A), use is made of the filter membrane (a) that is made of a polyolefin resin and has an initial filtration efficiency of not less than 99.9% for a filtering particle size of 20 μm. The phrase initial filtration efficiency of not less than 99.9% for a filtering particle size of 20 μm means that, in an initial state immediately after the start of filtration in which the filtration efficiency is lowest, the membrane can filter, i.e., capture 99.9% or more of foreign substances having a maximum size of 20 μm, namely, foreign substances having a particle size of not less than 20 μm.

The filtration efficiency of the filter membrane may be determined in the following manner. Reference powder ACFTD (air cleaner fine test dust: polydisperse powder obtained by classifying natural dust collected in the Arizona desert in the USA) is added to purified water to a concentration of 0.3 ppm, thereby preparing a liquid to be filtered (hereinafter, referred to as the ACFTD liquid). A filtration test is carried out in which the ACFTD liquid is passed through the filter membrane at a flow rate of 10 L/min one time. The ACFTD liquid and the filtrate obtained by the filtration test are analyzed with a laser scattering particle size distribution analyzer (8000A/8000S manufactured by Hiac Royco) so as to determine the number of particles per unit volume. With respect to the particles having a particle size of 20 μm or more, the proportion of the particles that have escaped the filter membrane (the capture failure rate) is determined in accordance with the equation (1) below. Based on the capture failure rate, the initial filtration efficiency for a filtering particle size of 20 μm is determined in accordance with the equation (2) below.

Capture failure rate [%]=number of particles in the filtrate having a particle diameter size of not less $$\text{than 20 μm/number of particles in the ACFTD solution having a particle diameter size of not less than 20 μm} \times 100 \qquad (1)$$

$$\text{Initial filtration efficiency [\%]} = 100 - \text{capture failure rate [\%]} \qquad (2)$$

In the present invention, the term particle size indicates a particle diameter measured by the above light scattering method.

The polyolefin resin is not particularly limited, and the filter membrane (a) may be appropriately a polyethylene filter membrane or a polypropylene filter membrane. The polyolefin resin is not dissolved or swollen by the polymer solution. Thus, the polymer solution can be filtered in a favorable manner. Unlike the polyolefin resin which forms the filter membrane (a), another kind of resin, for example, nylon is swollen by the polymer solution with the result that a filter membrane composed of nylon is clogged and often fails to perform filtration.

According to the inventive process, a non-aqueous battery electrode-forming binder solution that is free of foreign substances causing internal short circuits (shorts) may be obtained through the step (A).

The filter membrane (a) used in the step (A) preferably has a multilayer structure having two or more layers. The opening size of the filter membrane (a) on a secondary side is preferably smaller than the opening size on a primary side.

The term opening size indicates the size of openings (holes) in the filter membrane.

The primary side of the filter membrane (a) is an upstream side in the step (A), namely, the side that is in contact with the polymer solution before filtration. The secondary side is a downstream side in the step (A), namely, the side through which the polymer solution that has been filtered flows out.

When the filter membrane (a) has a multilayer structure with two or more layers and the opening size of the filter membrane on the secondary side is smaller than the opening size on the primary side, the membrane can capture foreign substances stepwise in the order of decreasing particle diameters. Thus, the occurrence of clogging in the filter membrane (a) can be delayed. Further, the pressure loss caused in the step (A) may be maintained at a low level.

In a preferred embodiment, the filter membrane (a) is used in the step (A) as a filter element including the filter membrane (a).

In detail, it is preferable that the filter membrane (a) be a cylindrical filter membrane that has been pleated so as to have vertical grooves on the entire outer peripheral surface thereof, and a filter element in which thermoplastic resin plates are joined to upper and lower ends of the cylindrical filter membrane be used in the step (A).

Because the filter membrane (a) constituting the filter element has been pleated so as to have vertical grooves on the outer peripheral surface thereof, the area of the filter membrane (a) per unit volume is increased.

An exemplary structure of the filter element is described in JP-A-H05-329338.

For example, the step (A) may be performed in a manner such that the polymer solution is filtered by being passed through the filter membrane (a) utilizing the weight of the polymer solution itself, or in a manner such that the polymer solution is filtered by being passed through the filter membrane (a) using a driving apparatus such as a pump. From the viewpoints of the productivity of the non-aqueous battery electrode-forming binder solution and the prevention of contamination with foreign substances caused by the use of a driving apparatus, the step (A) is preferably a step in which the polymer solution is filtered by being pressurized with nitrogen gas and thereby being passed from the primary side of the filter membrane (a) toward the secondary side. In this case, the difference between the pressure on the secondary side and that on the primary side in the step (A) is preferably maintained in the range of 0.01 to 0.1 MPa. This pressure difference ensures that an excessive load is not applied to the members such as the filter membrane (a) used in the step (A) and the non-aqueous battery electrode-forming binder solution can be produced in a favorable manner.

FIG. 1 illustrates a filter element 5 which may be used in the invention. As illustrated in FIG. 1(a), thermoplastic resin plates 3 are joined to upper and lower ends of a cylindrical filter membrane 1 that has been pleated so as to have vertical grooves on the entire outer peripheral surface thereof. A hole (aperture) 3' is provided in one of the thermoplastic resin plates 3 in order to discharge the polymer solution that has been filtered. FIG. 1(b) illustrates a positional relation of the members before the thermoplastic resin plates 3 are joined.

The filter element used in the invention may have a support material provided inside (on the inner peripheral side of) the filter membrane in order to increase the strength, or may have a cover provided outside (on the outer peripheral side of) the filter membrane in order to increase the strength.

Embodiments for carrying out the step (A) are not particularly limited as long as the polymer solution is filtered through the filter membrane (a). In an embodiment, for example, the polymer solution may be passed through a resin filter (a filtration apparatus) described later. Herein, the resin filter has a structure in which the aforementioned filter element is placed in a housing (case) and the polymer solution supplied from the inlet of the resin filter is filtered through the filter membrane (a), which constitutes the filter element, and the polymer solution that has been filtered is discharged from the outlet of the resin filter.

Figure 2:
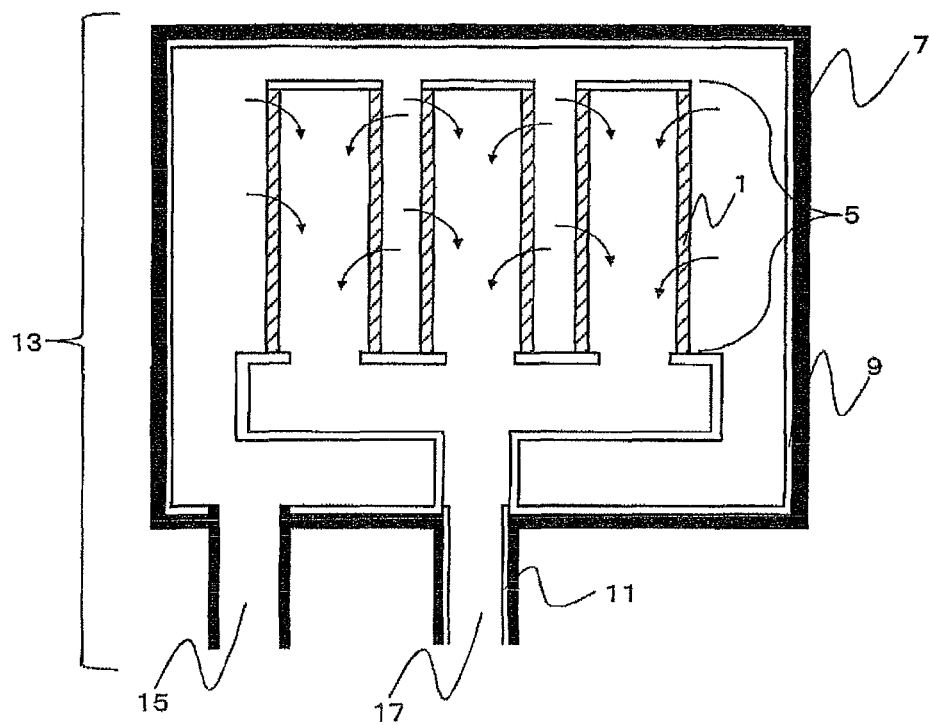
FIG. 2 is a view illustrating a resin filter which may be used in performing the step (A) of a process for producing non-aqueous battery electrode-forming binder solutions according to the invention.

In the invention, embodiments for carrying out the step (A) are not particularly limited as long as the polymer solution is filtered through the filter membrane (a). In particular, it is preferable to perform the step (A) using a resin filter. In detail, the step (A) may be carried out by passing the polymer solution through a resin filter (a filtration apparatus) 13 illustrated in FIG. 2. The resin filter 13 has a structure in which the filter elements 5 having the filter membrane 1 are arranged in a housing (case) 7. The resin filter 13 is usually configured such that the polymer solution which has been filtered, namely, the polymer solution which has been passed through the filter membrane 1 will not be in contact with any metals. The housing (case) 7 is preferably formed of a polyolefin resin. When the housing (case) is made of a metallic material, it is preferable that a cartridge formed of a polyolefin resin be provided inside the housing in order to prevent the polymer solution from contact with the housing (case). In FIG. 2, the filter elements 5 are joined to a cartridge 9 provided inside the housing (case), and members such as a pipe through which the filtered polymer solution is discharged are coated with a lining resin 11.

The resin filter 13 illustrated in FIG. 2 is configured such that the polymer solution is supplied from an inlet 15, the supplied polymer solution is filtered through the filter membrane 1, and the filtered polymer solution is discharged from an outlet 17. In the resin filter 13 illustrated in FIG. 2, members such as a pipe through which the polymer solution is discharged are coated with a lining resin 11. Although three filter elements 5 are described in FIG. 2, the number of the filter elements may be appropriately adjusted in accordance with, for example, the amount of the supplied polymer solution or the size of the filter elements.

According to the inventive production process, foreign substances are removed from the polymer solution through the step (A) and the steps (X) and (Y), which are performed in a preferred embodiment. In particular, magnetic substances such as metals can be favorably removed through the step (A) and the step (Y). However, any contact between the polymer solution and a metal that takes place after the step (A) is not preferable because the metal that has contacted the polymer solution can contaminate the solution as a foreign substance. Thus, in the process for producing non-aqueous battery electrode-forming binder solutions, it is preferable that the polymer solution be placed into a container without any contact with metals after the step (A).

In detail, members which are provided downstream the filter membrane (a) and will be in contact with the polymer solution, for example a housing, pipes, nozzles and valves, are suitably made of a resin or lined with a resin. In this manner, the polymer solution may be placed into a container without any contact with metals after the step (A). The resin is preferably a polyolefin resin such as polyethylene or polypropylene.

For the similar reason, the container for containing the polymer solution is preferably made of a resin or lined with a resin. The use of a high-density polyethylene container is more preferable.

The inventive production process preferably includes, after the step (A) is performed, placing the polymer solution into a container, encapsulating nitrogen gas into the container containing the polymer solution so as to fill the space in the container, and tightly sealing the container. By placing the polymer solution into a container and thereafter encapsulating nitrogen gas into the container containing the polymer solution so as to fill the space in the container, the air present in the space can be replaced by the nitrogen gas. In this manner, oxygen and water present in the air are expelled from the sealed container, and the electrode-forming binder solution can be prevented from absorbing moisture or being oxidized by oxygen. Further, the container is prevented from being deformed due to oxygen and water being dissolved in the binder solution.

Tightly sealing the container in the above manner results in the non-aqueous battery electrode-forming binder solution tightly sealed in the container.

In the inventive process, all the members that are brought into contact with the organic solvent are desirably not dissolved or swollen by the organic solvent. In view of this, the resin that constitutes the resin members and the resin-lined members is preferably a polyolefin resin.

The inventive process may include additional steps other than the steps (A), (X) and (Y). Exemplary additional steps include a heating step and a cooling step.

Each of the steps (A), (X) and (Y) may be repeated as required.

<Non-Aqueous Battery Electrode-Forming Binder Solutions>

A non-aqueous battery electrode-forming binder solution according to the present invention may be obtained by the aforementioned process for producing non-aqueous battery electrode-forming binder solutions. The non-aqueous battery electrode-forming binder solution of the invention is advantageous in that a non-aqueous battery such as a lithium ion secondary battery which has an electrode formed using the binder solution is prevented from the occurrence of internal short circuits (shorts).

In the non-aqueous battery electrode-forming binder solution, the number of foreign substances that are 20 μm or more in maximum size is preferably not more than 1, and more preferably 0 per 400 ml of the electrode-forming binder solution.

EXAMPLES

The present invention will be described in detail by presenting examples hereinbelow without limiting the scope of the invention.

Example 1

A 150 L volume dissolving tank equipped with a stirrer was thoroughly purged with nitrogen to create a nitrogen atmosphere in the tank.

Thereafter, the dissolving tank was charged with 130 kg of N-methyl-2-pyrrolidone (hereinafter, also referred to as NMP) having a temperature of 25° C. The stirrer was activated. Subsequently, 11.5 kg of powder of polyvinylidene fluoride (a vinylidene fluoride homopolymer, hereinafter also referred to as PVDF) was added. The dissolving tank was purged again with nitrogen to create a nitrogen atmosphere in the tank.

Warm water was circulated in a jacket fitted to the dissolving tank so as to maintain the temperature in the dissolving tank at 50° C. for 7 hours. Thereafter, the temperature was lowered to 39° C. Thus, a PVDF solution containing PVDF at 8.1% by mass and having a solution viscosity of 1770 mPa·s was obtained.

The stirrer was switched off. The surface of the PVDF solution was pressurized with nitrogen gas at 0.3 MPa, and the PVDF solution was discharged through a discharge line that was provided at a lower portion of the dissolving tank. The discharged solution was placed into a high-density polyethylene container. Nitrogen gas was blown into the space in the polyethylene container, and the container was thereafter tightly sealed. Thus, an electrode-forming binder solution (1) was obtained.

The line between the dissolving tank and the container had a Y-shaped strainer (400 meshes) as a prefilter, a magnetic iron remover (12000 Gs) as a magnetic filter, and a resin filter having a filter membrane (a) that were provide in this order from the upstream side (the dissolving tank side).

The resin filter used herein contained a filter element which was arranged in a polypropylene housing and in which thermoplastic resin plates were joined to upper and lower ends of a cylindrical filter membrane that had been pleated so as to have vertical grooves on the entire outer peripheral surface thereof. The filter membrane was a three-layered polypropylene filter membrane which had a smaller opening size on a secondary side than on a primary side and an initial filtration efficiency of not less than 99.9% for a filtering particle size of 20 μm.

The pressure applied to the resin filter during the filtration was 0.30 MPa on the primary side (the dissolving tank side) and 0.24 MPa on the secondary side (the container side), with the pressure difference being 0.06 MPa. The flow rate of the filtrate was 9 kg/min.

The inner surface of the resin filter including the housing and nozzles was formed of a resin. The line downstream the resin filter was composed of polyethylene-lined carbon steel pipes and Teflon (registered trademark)-lined valves. In this manner, the PVDF solution was placed into the container without any contact with metals after the filtration step.

Foreign substances were not detected in the electrode-forming binder solution (1) by an observation method described later. The use of such a binder solution in the production of an electrode for a non-aqueous battery such as a lithium ion secondary battery suppresses the occurrence of internal short circuits (shorts) in the battery.

Example 2

The procedures in Example 1 were repeated except that 11.5 kg of the PVDF powder used in Example 1 was replaced by 19.6 kg of powder of a vinylidene fluoride-maleic acid monomethyl ester copolymer (hereinafter, also referred to as VDF-MMM copolymer). Thus, a VDF-MMM copolymer solution containing the VDF-MMM copolymer at 13.1% by mass and having a solution viscosity of 760 mPa·s was obtained.

An electrode-forming binder solution (2) was obtained in the same manner as in Example 1, except that the PVDF solution used in Example 1 was replaced by the VDF-MMM copolymer solution.

The pressure applied to the resin filter during the filtration was 0.30 MPa on the primary side (the dissolving tank side) and 0.28 MPa on the secondary side (the container side), with the pressure difference being 0.02 MPa. The flow rate of the filtrate was 15 kg/min.

Foreign substances were not detected in the electrode-forming binder solution (2) by an observation method described later. The use of such a binder solution in the production of an electrode for a non-aqueous battery such as a lithium ion secondary battery suppresses the occurrence of internal short circuits (shorts) in the battery.

Example 3

An electrode-forming binder solution (3) was obtained in the same manner as in Example 1, except that the Y-shaped strainer and the magnetic iron remover were not used.

The pressure applied to the resin filter during the filtration was 0.30 MPa on the primary side (the dissolving tank side) and 0.23 MPa on the secondary side (the container side), with the pressure difference being 0.07 MPa. The flow rate of the filtrate was 8 kg/min.

Foreign substances were not detected in the electrode-forming binder solution (3) by an observation method described later. The use of such a binder solution in the production of an electrode for a non-aqueous battery such as a lithium ion secondary battery suppresses the occurrence of internal short circuits (shorts) in the battery. However, because there is only the filter membrane in the resin filter for capturing foreign substances, it is probable that foreign substances will find their way into the electrode-forming binder solution in the event of breakage of the filter membrane. Thus, the production of the electrode-forming binder solution preferably involves a step of removing solids in the solution through a prefilter, and a step of removing magnetic substances in the solution through a magnetic filter.

Comparative Example 1

An electrode-forming binder solution (c1) was obtained in the same manner as in Example 1, except that the resin filter was not used.

Because the filtration in Comparative Example 1 did not involve the resin filter, the electrode-forming binder solution (c1) was detected by an observation method described later to contain minute foreign substances that were difficult to remove through the prefilter and the magnetic filter. The use of such a binder solution in the production of an electrode for a non-aqueous battery such as a lithium ion secondary battery can result in the occurrence of internal short circuits (shorts) in the battery.

Comparative Example 2

An electrode-forming binder solution (c2) was obtained in the same manner as in Example 2, except that the resin filter was not used.

Because the filtration in Comparative Example 2 did not involve the resin filter, the electrode-forming binder solution (c2) was detected by an observation method described later to contain minute foreign substances that were difficult to remove through the prefilter and the magnetic filter. The use of such a binder solution in the production of an electrode for a non-aqueous battery such as a lithium ion secondary battery can result in the occurrence of internal short circuits (shorts) in the battery.

Comparative Example 3

The procedures in Example 1 were repeated except that the filter membrane used in Example 1, namely, the three-layered polypropylene filter membrane which had a smaller opening size on a secondary side than on a primary side and an initial filtration efficiency of not less than 99.9% for a filtering particle size of 20 μm, was changed to a three-layered nylon filter membrane which had a smaller opening size on a secondary side than on a primary side and an initial filtration efficiency of not less than 99.9% for a filtering particle size of 20 μm. However, the resin filter did not substantially permit the PVDF solution to be passed therethrough, and the PVDF solution was not placed into the container.

This result is probably due to the nylon being swollen by N-methyl-2-pyrrolidone and the consequent clogging of the filter membrane.

Comparative Example 4

An electrode-forming binder solution (c4) was obtained in the same manner as in Example 1, except that the filter membrane used in Example 1, namely, the three-layered polypropylene filter membrane which had a smaller opening size on a secondary side than on a primary side and an initial filtration efficiency of not less than 99.9% for a filtering particle size of 20 μm, was changed to a three-layered polypropylene filter membrane which had a smaller opening size on a secondary side than on a primary side and an initial filtration efficiency of not less than 98% for a filtering particle size of 20 μm.

The filter membrane used in Comparative Example 4 was inferior in terms of filtration efficiency to the filter membrane used in Examples. As a result, the electrode-forming binder solution (c4) was detected by an observation method described later to contain minute foreign substances that were difficult to remove through the prefilter, the magnetic filter and the filter membrane. The use of such a binder solution in the production of an electrode for a non-aqueous battery such as a lithium ion secondary battery can result in the occurrence of internal short circuits (shorts) in the battery.

Comparative Example 5

A PVDF solution having a solution viscosity of 800 mPa·s was obtained in the same manner as in Example 1, except that the temperature in the dissolving tank was 80° C. and cooling was not performed.

The PVDF solution having a solution viscosity of 800 mPa·s was treated in the same manner as in Example 1, except that the resin filter was not used, thereby placing the PVDF solution into the container. The container was tightly sealed without encapsulating nitrogen gas into the space in the container. Thus, an electrode-forming binder solution (c5) was obtained.

Because the filtration in Comparative Example 5 did not involve the resin filter, the electrode-forming binder solution (c5) was detected to contain minute foreign substances that were difficult to remove through the prefilter and the magnetic filter. The use of such a binder solution in the production of an electrode for a non-aqueous battery such as a lithium ion secondary battery can result in the occurrence of internal short circuits (shorts) in the battery.

The container containing the electrode-forming binder solution (c5) was deformed after 48 hours after it was sealed.

[Observation of Electrode-Forming Binder Solutions]

A 400 ml portion of each of the electrode-forming binder solutions obtained in Examples and Comparative Examples was collected from the container. The collected binder solution was filtered through a filter paper (opening size: 5 μm) using a suction filtration apparatus. The filter paper was washed with N-methyl-2-pyrrolidone and acetone, and was dried. The dried filter paper was observed with a light microscope and the number of foreign substances was counted. The foreign substances were categorized into metallic foreign substances and nonmetallic foreign substances based on the appearance. The number of foreign substances that were 20 μm or more in maximum size was counted.

The results are described in Table 1.

[Observation of Capture of Foreign Substances Through Resin Filter]

The filter membranes that constituted the resin filters used in Examples and Comparative Examples were visually observed in order to evaluate the presence or absence of foreign substances that had been captured.

The results are described in Table 1.

[Observation of Containers]

The containers containing the electrode-forming binder solutions from Examples and Comparative Examples were visually observed at regular intervals for 48 hours after they were sealed. The presence or absence of deformation of the container was evaluated.

The results are described in Table 1.

TABLE 1

| | Observation of electrode-forming binder solutions | | Capture of foreign | |
| --- | --- | --- | --- | --- |
| | Metallic foreign substances (number) | Nonmetallic foreign substances (number) | substances through resin filter (Visual observation) | Deformation of containers (Visual observation) |
| Ex. 1 | 0 | 0 | Not captured | Not deformed |
| Ex. 2 | 0 | 0 | Not captured | Not deformed |
| Ex. 3 | 0 | 0 | Captured | Not deformed |
| Comp. Ex. 1 | 2 | 13 | — | Not deformed |
| Comp. Ex. 2 | 3 | 18 | — | Not deformed |
| Comp. Ex. 3 | — | — | — | — |
| Comp. Ex. 4 | 2 | 5 | Not captured | Not deformed |
| Comp. Ex. 5 | 2 | 15 | — | Deformed |

The invention claimed is:

1. A process for producing non-aqueous battery electrode-forming binder solutions, comprising a step (A) of filtering a polymer solution of a vinylidene fluoride resin in an organic solvent through a filter membrane (a) that is made of a polyolefin resin and has an initial filtration efficiency of not less than 99.9% for a filtering particle size of 20 μm, wherein the polymer solution contains a magnetic substance prior to filtering.

2. The process for producing non-aqueous battery electrode-forming binder solutions according to claim 1, wherein the filter membrane (a) has a multilayer structure having two or more layers, and the opening size of the filter membrane (a) on a secondary side is smaller than the opening size on a primary side.

3. The process for producing non-aqueous battery electrode-forming binder solutions according to claim 1, wherein the filter membrane (a) is a cylindrical filter membrane that has been pleated so as to have vertical grooves on the entire outer peripheral surface thereof, and
   a filter element in which thermoplastic resin plates are joined to upper and lower ends of the cylindrical filter membrane is used in the step (A).

4. The process for producing non-aqueous battery electrode-forming binder solutions according to claim 1, wherein the process includes at least one step that is upstream of the step (A) and is selected from:
   a step (X) of preliminarily filtering the polymer solution through a prefilter, and a step (Y) of removing at least part of the magnetic substance present in the polymer solution through a magnetic filter.

5. The process for producing non-aqueous battery electrode-forming binder solutions according to claim 1, wherein after the step (A), the polymer solution is placed into a container without any contact with a metal.

6. The process for producing non-aqueous battery electrode-forming binder solutions according to claim 1, wherein the vinylidene fluoride resin is at least one resin selected from vinylidene fluoride homopolymers, copolymers of vinylidene fluoride and another monomer, modified products of vinylidene fluoride homopolymers, and modified products of copolymers of vinylidene fluoride and another monomer.

7. The process for producing non-aqueous battery electrode-forming binder solutions according to claim 1, wherein the organic solvent is N-methyl-2-pyrrolidone.

8. The process for producing non-aqueous battery electrode-forming binder solutions according to claim 1, wherein the step (A) is a step in which the polymer solution is filtered by being pressurized with nitrogen gas and thereby being passed from a primary side of the filter membrane (a) toward a secondary side, and
   the difference between the pressure on the secondary side and that on the primary side in the step (A) is maintained in the range of 0.01 to 0.1 MPa.

9. The process for producing non-aqueous battery electrode-forming binder solutions according to claim 1, wherein the temperature of the polymer solution is 10 to 70° C., and the solution viscosity is 250 to 3500 mPa·s.

10. The process for producing non-aqueous battery electrode-forming binder solutions according to claim 1, wherein the process includes, after the step (A) is performed, placing the polymer solution into a container, encapsulating nitrogen gas into the container containing the polymer solution so as to fill the space in the container, and tightly sealing the container.

11. A non-aqueous battery electrode-forming binder solution that is produced by the process for producing non-aqueous battery electrode-forming binder solutions described in claim 10.

* * * * *